United States Patent
Mori et al.

(10) Patent No.: US 10,056,854 B2
(45) Date of Patent: Aug. 21, 2018

(54) MOTOR CONTROL UNIT AND ELECTRIC POWER STEERING APPARATUS USING THE SAME AND VEHICLE

(71) Applicant: NSK LTD., Tokyo (JP)

(72) Inventors: Kenji Mori, Fujisawa (JP); Kouichi Nampei, Fujisawa (JP); Yoshihiro Aosaki, Fujisawa (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 15/307,417

(22) PCT Filed: Jul. 13, 2015

(86) PCT No.: PCT/JP2015/069982
§ 371 (c)(1),
(2) Date: Oct. 28, 2016

(87) PCT Pub. No.: WO2016/009976
PCT Pub. Date: Jan. 21, 2016

(65) Prior Publication Data
US 2017/0117833 A1    Apr. 27, 2017

(30) Foreign Application Priority Data

Jul. 14, 2014  (JP) ................. 2014-144107

(51) Int. Cl.
*H02P 6/17*    (2016.01)
*H02P 21/22*   (2016.01)
(Continued)

(52) U.S. Cl.
CPC ............ *H02P 6/17* (2016.02); *B62D 5/046* (2013.01); *H02P 21/22* (2016.02); *H02P 27/08* (2013.01)

(58) Field of Classification Search
CPC ............ H02P 6/17; H02P 21/22; H02P 27/08
(Continued)

(56) References Cited

U.S. PATENT DOCUMENTS 5,754,026 A * 5/1998 Hampo ............... H02P 23/0004
                                                318/713
6,158,553 A   12/2000 Oshima et al.
(Continued)

FOREIGN PATENT DOCUMENTS

GB    2 323 984 A    10/1998
JP    2000-4600 A    1/2000
(Continued)

OTHER PUBLICATIONS

International Search Report for PCT/JP2015/069982 dated Sep. 29, 2015 [PCT/ISA/210].
(Continued)

*Primary Examiner* — Kawing Chan
(74) *Attorney, Agent, or Firm* — Sughrue Mion, PLLC

(57) ABSTRACT

A motor control unit that does not make an occurrence of a noisy sound and a vibration and does not give a steering discomfort by changing parameters of a current feedback control section even if an electric characteristic of the motor varies with a system-switching due to a failure occurrence, and to an electric power steering apparatus using the same and a vehicle. The motor control unit controls a motor having multi-system motor windings by means of a 3-phase current feedback system provided with a current control section through a motor driving circuit of each winding system, having a function that changes by switching parameters of the current control section corresponding to a driving system number of the multi-system motor windings.

7 Claims, 8 Drawing Sheets

(51) Int. Cl.
*H02P 27/08* (2006.01)
*B62D 5/04* (2006.01)

(58) Field of Classification Search
USPC .............................. 318/400.07, 400.01, 700
See application file for complete search history.

(56) References Cited

U.S. PATENT DOCUMENTS

| | | | |
|---|---|---|---|
| 6,426,602 | B1 | 7/2002 | McCann et al. |
| 2002/0005704 | A1 | 1/2002 | Yoshikawa et al. |
| 2003/0085683 | A1 | 5/2003 | Satake et al. |
| 2013/0234635 | A1* | 9/2013 | Kojima ..................... H02P 6/12 318/400.21 |
| 2014/0009093 | A1* | 1/2014 | Suzuki ................ H02P 21/0096 318/400.02 |
| 2014/0312809 | A1* | 10/2014 | Ishida ..................... H02P 25/22 318/139 |

FOREIGN PATENT DOCUMENTS

| | | |
|---|---|---|
| JP | 2002-10684 A | 1/2002 |
| JP | 2003-153585 A | 5/2003 |
| JP | 2013-38950 A | 2/2013 |
| JP | 2013-236486 A | 11/2013 |

OTHER PUBLICATIONS

Communication dated Nov. 16, 2017 from the European Patent Office in counterpart application No. 15822546.6.

Hackner et al., "Optimization of the Winding Arrangement to Increase the Zero-Sequence Inductance of a Synchronous Machine with Multifunctional Converter Drive," IEEE Transactions on Industry Applications, vol. 48, No. 6, Nov./Dec. 2012, pp. 2277-2286.

* cited by examiner

PRIOR ART

TRIANGLE-FORMED
WINDING ARRANGEMENT

MOTOR CONTROL UNIT AND ELECTRIC POWER STEERING APPARATUS USING THE SAME AND VEHICLE

CROSS REFERENCE TO RELATED APPLICATIONS

This application is a National Stage of International Application No. PCT/JP2015/069982, filed on Jul. 13, 2015, which claims priority from Japanese Patent Application No. 2014-144107, filed on Jul. 14, 2014, the contents of all of which are incorporated herein by reference in their entirety.

TECHNICAL FIELD

The present invention relates to a motor control unit that controls a motor having multi-system motor windings by means of a 3-phase current feedback system provided with a current control section through a motor driving circuit of each winding system and to an electric power steering apparatus using the same and a vehicle, and in particular to the motor control unit that has a function that changes by switching parameters of the current control section corresponding to a driving system number of multi-system motor windings, wherein a noisy sound and a vibration are not generated even if the system is switched, and to the electric power steering apparatus using the same and the vehicle.

The electric power steering apparatus provided with the vehicle gives an assist force to a steering system of the vehicle through a motor (brushless motor) by means of a current command value calculated based on a steering torque at least, and is driving-controlled with inverters composed of a bridge circuit.

BACKGROUND ART

There has been an electric power steering apparatus (EPS) as an apparatus that is provided a motor in a driving section, and the electric power steering apparatus gives a steering assist force (assist force) to a steering mechanism of the vehicle through a rotational force of the motor, and gives a motor driving force controlled with an electric power supplied from an inverter as a steering assist force to a steering shaft or a rack shaft by using a transmission mechanism of gears and so on. In order to accurately generate the assist torque of a steering assist force, such a conventional electric power steering apparatus performs the feedback control of a motor current. The feedback control adjusts the voltage supplied to the motor so that the difference between a current command value and a detected motor current value becomes small, and the adjustment of a motor applying voltage is generally performed by the adjustment of a duty ratio of a PWM (Pulse Width Modulation) control, and a brushless motor that is superior in durability and serviceability and is low noise, is commonly used as the motor.

To describe the general construction of the electric power steering apparatus is shown in FIG. 1, a handle 1 of a column shaft (steering shaft, handle shaft) 2 is connected to steered wheels 8L, 8R through reduction gears 3 in a reducing section, universal joints 4a and 4b, a pinion rack mechanism 5, tie rods 6a and 6b, further via hub units 7a and a 7b. In addition, the column shaft 2 is provided with a torque sensor 10 for detecting a steering torque Ts of the steering wheel 1 and a steering angle sensor 14 for detecting a steering angel 6, and a motor 20 for assisting the steering force of the steering wheel 1 is connected to the column shaft 2 through the reduction gears 3. Electric power is supplied to a control unit (ECU) 30 for controlling the electric power from a battery 13, and an ignition key signal is inputted into the control unit 30 through an ignition key 11. The control unit 30 calculates a current command value of the assist (steering assist) command based on the steering torque Ts detected by the torque sensor 10 and the vehicle speed Vs detected by the vehicle speed sensor 12, and controls a current to the motor for EPS based on a voltage control command value Vref by performing a compensation and so on with respect to the current command value.

Further, the steering angle sensor 14 is not indispensable and may not be provided, and it is possible to obtain the steering angle from a rotational position sensor such as a resolver connected to the motor 20.

A controller area network (CAN) 40 to send/receive various information and signals on the vehicle is connected to the control unit 30, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40.

The control unit 30 mainly comprises a CPU (including an MPU and an MCU), and general functions performed by programs within the CPU are shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from CAN 40) are inputted into a current command value calculating section 31. The current command value calculating section 31 calculates a current command value Iref1 that is the target value of the current supplied to the motor 20 based on the steering torque Is and the vehicle speed Vs and by means of an assist map or the like. The current command value Iref1 is inputted into a current limiting section 33 through an adding section 32A as a current command value Iref2. A current command value Irefm that is limited the maximum current, is inputted into a subtracting section 32B, and a deviation I (=Irefm−Im) between the current command value Irefm and a motor current value Im that is fed back, is calculated. The deviation I is inputted into a PI-control section 35 to improve the characteristic of the steering operation. The voltage control command value Vref that characteristic improvement is performed in the PI-control section 35, is inputted into a PWM-control section 36. Furthermore, the motor 20 is PWM-driven through an inverter 37 serving as a drive section. The current value Im of the motor 20 is detected by a motor current detector 38 and is fed back to the subtracting section 32B. In general, the inverter 37 uses EFTs as driving elements and is comprised of a bridge circuit of FETs.

Further, a compensation signal CM from a compensating section 34 is added to the adding section 32A, and the compensation of the system is performed by the addition of the compensation signal CM so as to improve a convergence, an inertia characteristic and so on. The compensating section 34 adds a self-aligning torque (SAT) 34-3 and an inertia 34-2 to an adding section 34-4, further adds the result of addition performed at the adding section 34-4 and a convergence 34-1 in an adding section 34-5, and then outputs the result of addition performed at the adding section 34-5 as the compensation signal CM.

In such the electric power steering apparatus, cases being used a motor having multi-system windings of a constitution to continue a motor operation even if a failure (including an abnormality) of the motor occurs, are increasing. For examples, with respect to a motor having 2-system windings, coils of a stator are separated to 2-systems (U1-W1 phases, first system and U2-W2 phases, second system), and it is possible to rotate a rotor of the other 1-system even if 1-system is failed and to continue the assist control.

In the motor control unit provided with such the motor and the electric power steering apparatus, for an example, a solution means in a case that an open-circuit failure of the motor windings or the inverter occurs, is disclosed in Japanese Published Unexamined Patent Application No. 2013-236486 A (Patent Document 1). That is, the apparatus disclosed Patent Document 1 relates to the motor control unit to control a current supplied from a power source and an applied voltage for the motor having winding group of the plural systems that: stops to supply a current to a winding that a failure occurred by a control of a switching element within the inverter at a failure side when a failure judging means judges an open-system failure, and continues a current-supplying to a normal winding that a failure does not occurs.

THE LIST OF PRIOR ART DOCUMENTS

Patent Documents

Patent Document 1: Japanese Published Unexamined Patent Application No. 2013-236486 A

SUMMARY OF THE INVENTION

Problems to be Solved by the Invention

However, although the apparatus disclosed in Patent Document 1 describes that switches the current control means at the normal time and the abnormal time, the concrete content is only that the apparatus corrects a q-axis current command value in order to compensate the motor characteristics change due to the failure and the details are not disclosed. Consequently, the characteristic change is generated and a noisy sound and a vibration occurs when the driving system is switched, it is considered that a physical disorder would be given to a driver in a case of the EPS.

The present invention has been developed in view of the above-described circumstances, and an object of the present invention is to provide a motor control unit that is capable of preventing the current response characteristic changing by switching parameters of the current feedback control section before and after of the failure in order to prevent from leading to the noisy sound/the vibration/the steering physical disorder feeling, with a matter that the current response characteristic varies due to a fact that the motor electric response characteristic changes by cutting-off the other system in two systems when the failure occurred, and to provide an electric power steering apparatus using the same and a vehicle.

Means for Solving the Problems

The present invention relates to a motor control unit that controls a motor having multi-system motor windings by means of a 3-phase current feedback system provided with a current control section through a motor driving circuit of each winding system, having: a function that changes by switching parameters of the current control section corresponding to a driving system number of the multi-system motor windings.

Further, the above-described object of the present invention is more effectively achieved by that: wherein the parameters are motor inductance parameters, or wherein the driving system number is "two", or wherein a current feedback control is individually performed for 6-phases, in total, of "3-phases×2-systems", or wherein a current feedback control is performed for 3-phases, in total, of one system with "3-phases×inter-system sum", or wherein a current feedback control is performed, in total, for 4-phases of "2-phases, in which 1-phase current is calculated from a sum of current values of 2-phases, ×2-systems", or wherein a current feedback control is performed for 2-phases, in total, of "2-phases, in which 1-phase current is calculated from a sum of current values of 2-phases, ×inter-system sum", or wherein assuming that "$M_P$" is a system-in inter-phase mutual inductance, "$L_P$" is a self-inductance, "$M_S$" is an inter-system another phase mutual inductance and "$M_L$" is an inter-system same phase mutual inductance, a parameter is ($L_P-M_P+M_L-M_S$) in a 2-system current control time and a parameter is ($L_P-M_P$) in a 1-system current control time.

By applying the above motor control unit to an electric power steering apparatus, the high reliability electric power steering apparatus that there are no occurrence of the noisy sound and the vibration at the failure occurrence time and the steering physical disorder feeling is not given to a driver, is achieved. Further, by providing the electric power steering apparatus with the vehicle, it is possible to further improve a reliability of the vehicle.

MODE FOR CARRYING OUT THE INVENTION

First, an example of a 2-system winding motor will be explained with reference to FIGS. 3 and 4. Although the present invention relates to an electric motor, the following explanations merely describes as a "motor".

Figure 1:
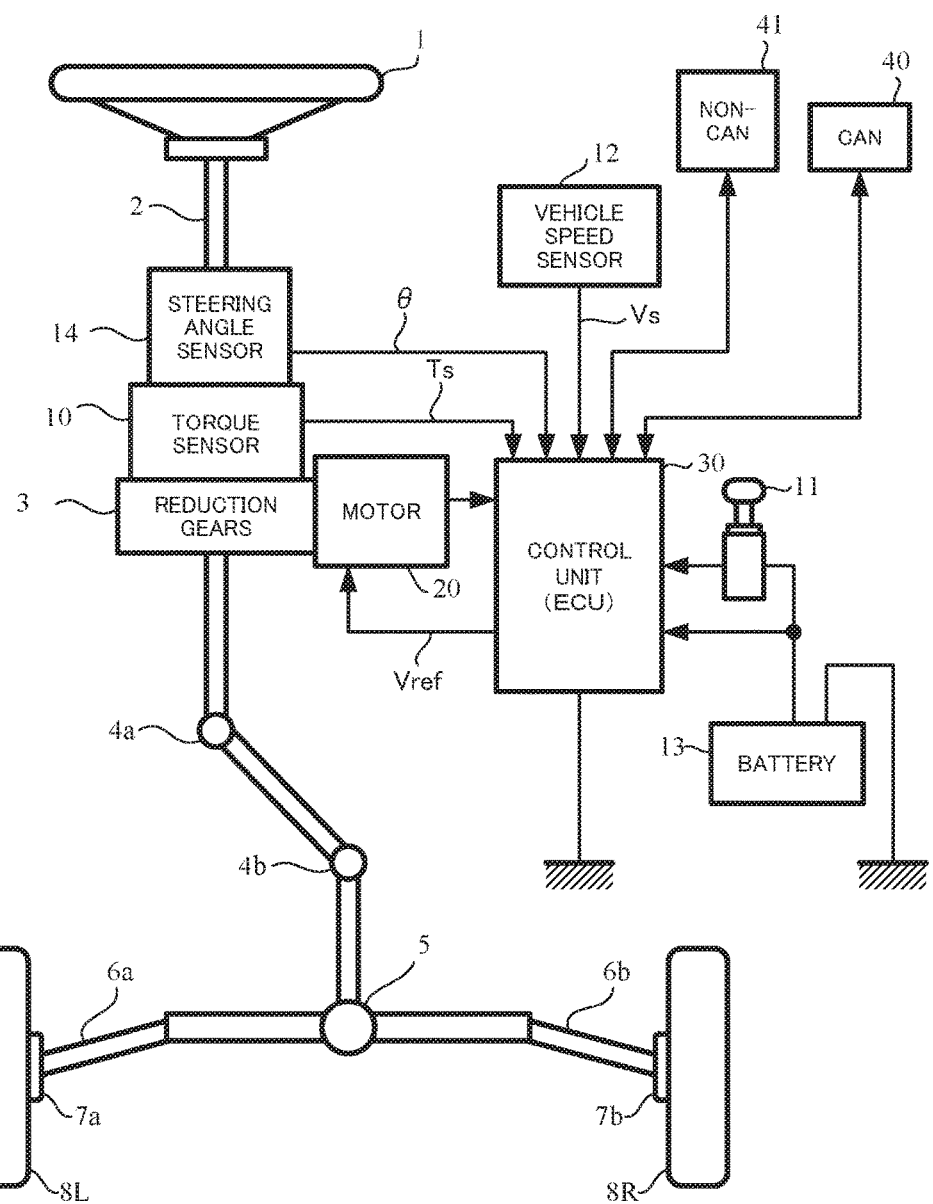
FIG. 1 is a configuration diagram illustrating a general outline of an electric power steering apparatus.
Figure 2:
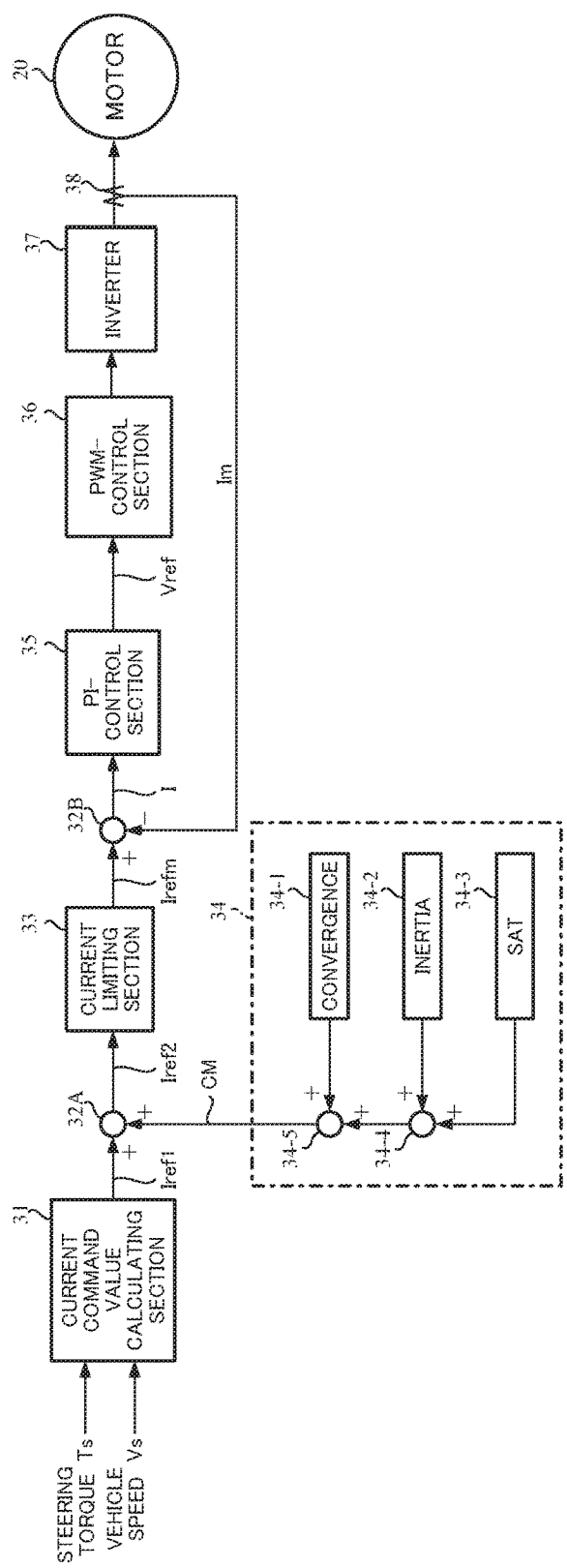
FIG. 2 is a block diagram showing a configuration example of a control unit (ECU) of the electric power steering apparatus.
Figure 3:
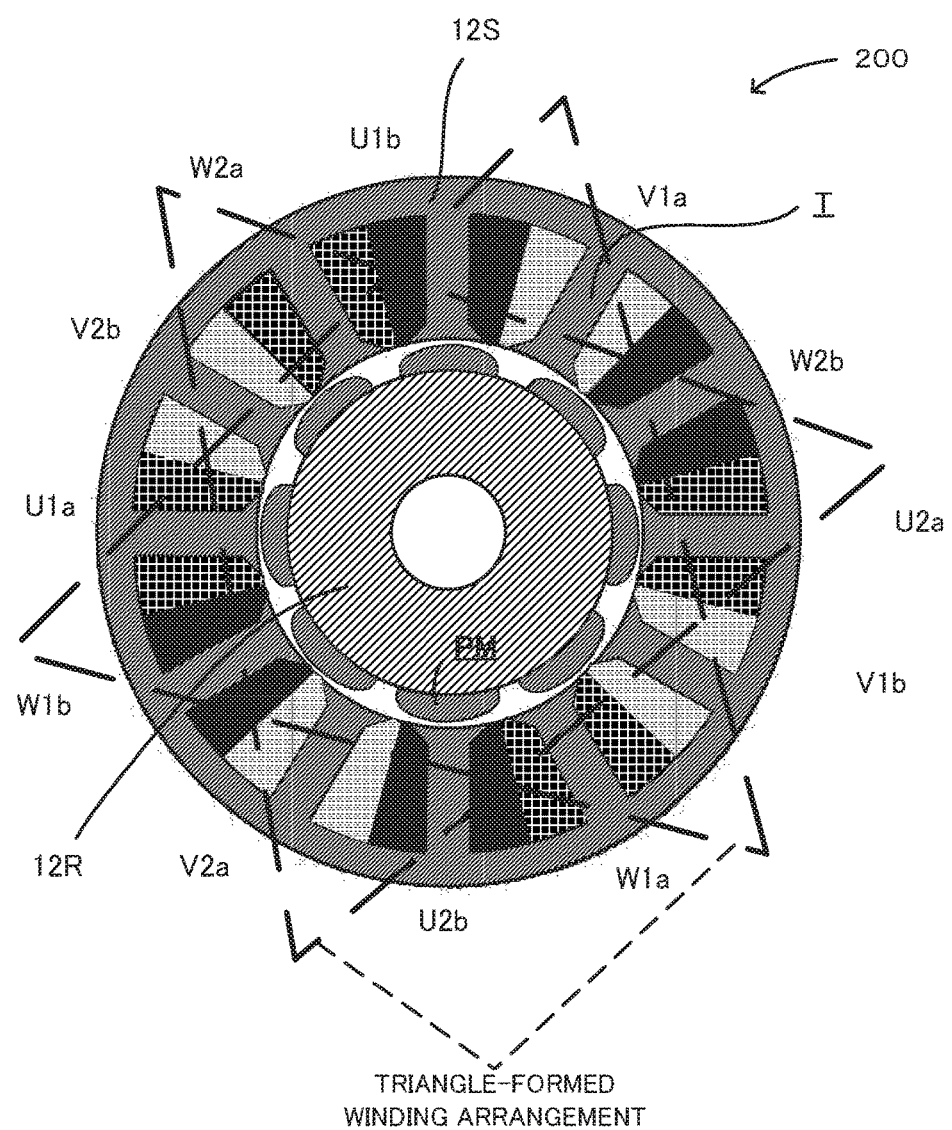
FIG. 3 is a sectional view showing a configuration example of a motor being capable of the present invention.

A 3-phase motor 200 has two triangle-formed winding arrangements as shown in FIG. 3, and has an SPM motor constitution comprising of a stator having teeth T which are magnetic poles forming slots projected to an inside direction of inner peripheral surface and an 8-poles surface magnet-type rotor 12R which is rotatable, wherein permanent magnets PM are disposed on the surface opposite to the teeth T at inside of the stator 12S. Here, the number of teeth T of the stator 12S is set as "phase number×2n ("n" is an integer equal to or more than 2)", for example, this embodiment is a constitution of 8-poles and 12-slots by setting "n=2".

Figure 4:
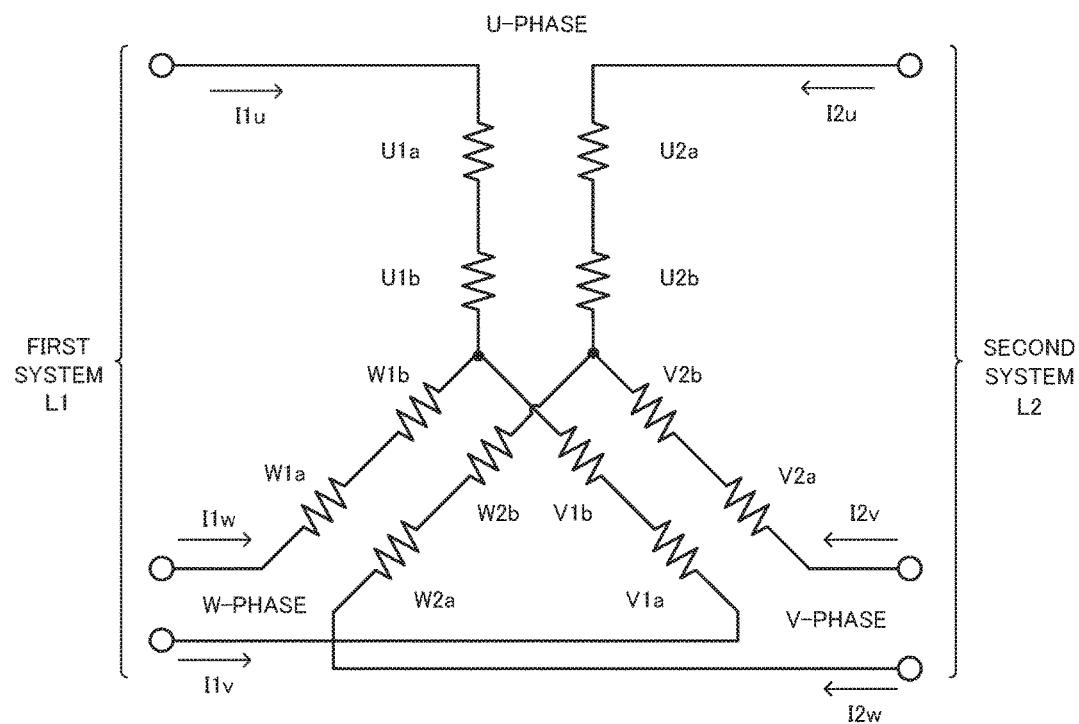
FIG. 4 is a configuration diagram showing a winding structure example of a motor being capable of the present invention.

Then, with 2-systems as shown in FIG. 4, a first 3-phase motor winding L1 and a second 3-phase motor winding L2 corresponding to poly-phase motor windings in which each magnetic pole of same phase becomes same phase for the rotor magnet, are wound on the slots SL of the stator 12S. The first 3-phase motor winding L1 is configured with a star connection by mutually connecting each end of U-phase windings U1a, U1b, V-phase windings V1a, V1b and W-phase windings W1a, W1b, and each other end of the U-phase windings U1a, U1b, the V-phase windings V1a, V1b and the W-phase windings W1a, W1b, are connected to the motor control unit 20. Motor driving currents I1u, I1v and I1w are individually supplied.

Further, the second 3-phase motor winding L2 is configured with a star connection by mutually connecting each end of U-phase windings U2a, U2b, V-phase windings V2a, V2b and W-phase windings W2a, W2b, and each other end of the U-phase windings U2a, U2b, the V-phase windings V2a, V2b and the W-phase windings W2a, W2b are connected to the motor control unit 20. Motor driving currents I2u, I2v and I2w are individually supplied.

Then, coil section s L1ua, L1ub, L1va, L1vb, and L1wa, L1wb of each phase coil L1u-L1w and coil sections L2ua, L2ub, L2va, L2vb, and L2wa, L2wb of each phase coil L2u-L2w, are wound so that a current-applying direction in the slots SL across each teeth T is the same direction.

In this way, the coil sections L1va, L1ub, L1va, L1vb, and L1wa, L1wb of the each phase coils L1u-L1w of the first 3-phase motor winding and the coil sections L2ua, L2ub, L2va, L2vb, and L2wa, L2wb of the each phase coils L2u-L2w of the second 3-phase motor winding are wound around different twelve teeth each other. That is, the first system, the phase coils L1va, L1va and L1wa are sequentially wound in the clockwise rotation and the same direction around the twelve teeth T. Then, the phase coil L2ua, L2va, and L2wa of the second system are sequentially wound in the clockwise rotation and the same direction, further the phase coils L1ub, L1vb and L1wb of the first system are sequentially wound in the clockwise rotation and the same direction, and finally the phase coils L2ub, L2vb and L2wb of the second system are sequentially wound in the clockwise rotation and the same winding direction around the twelve teeth T in a sequential order. In this connection, the coil sections of the same phase of the first 3-phase motor windings L1 and the second 3-phase motor windings L2 are wound so as not to simultaneously interlink to the same magnetic flux formed by the permanent magnets PM of each magnetic pole of the rotor 12R. Therefore, with the coil sections of the same phase of the first 3-phase motor windings L1 and the second 3-phase motor windings L2, the magnetic circuit is constituted to suppress a mutual magnetic interference to the minimum.

Figure 5:
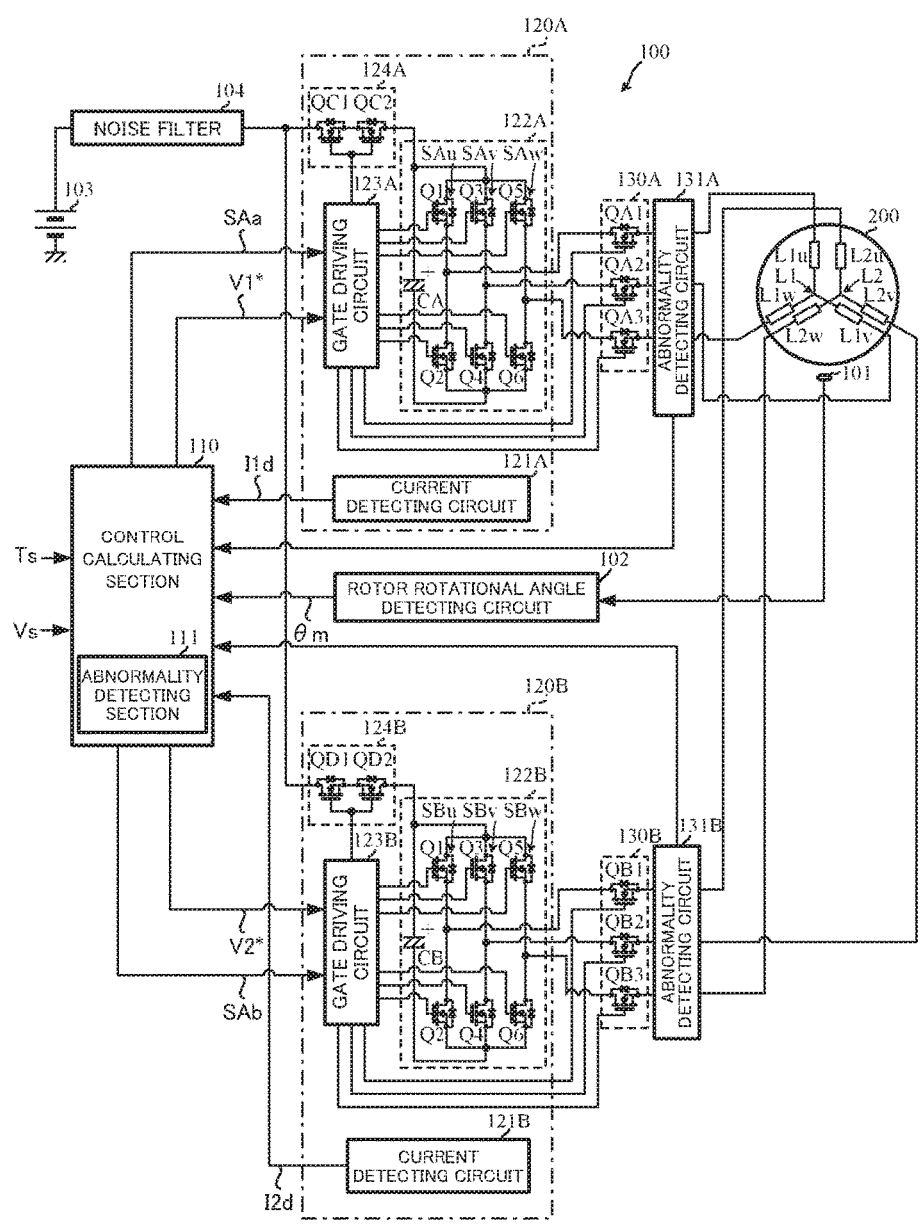
FIG. 5 is a block diagram showing a configuration example of a motor control unit.

For such the 3-phase motor having the 2-system windings, an example of the motor control unit that supplies a current from an individual inverter, decides a failure switching means when an OFF-failure (an open failure) which a switching means of one inverter becomes shut-down occurs, controls a switching means except for the failure switching means, and controls a normal inverter except for the failure inverter including the failure switching means will be explained with reference to FIG. 5.

The motor control unit 100 includes an abnormality detecting section 111, and comprises a control calculating section 110 to calculate a motor current command value, motor driving circuits 120A and 120B individually to which voltage command values V1* and V2* are inputted from the control calculating section 110, and motor current cut-off circuits 130A and 130B respectively provided between the output sides of the motor driving circuits 120A and 120B and the first motor winding L1 and the second motor winding L2 of the 3-phase motor 200.

The 3-phase motor 200 comprises a rotational position sensor 101 such as Hall element or the like that detects a rotational position of the rotor, the value detected by the rotational position sensor 101 is inputted into a rotor rotational angle detecting circuit 102, and a rotor rotational angle θm is detected in the rotor rotational angle detecting circuit 102. The steering torque Ts detected by the torque sensor 10 and the vehicle speed Vs detected by the vehicle speed sensor 12 as well as the rotor rotational angle θm outputted from the rotor rotational angle detecting circuit 102 are inputted into the control calculating section 110 in the motor control unit 100. Further, motor currents I1d and I2d outputted from each coil of the first motor winding L1 and the second winding L2 of the motor 200 and outputted from the current detecting circuits 121A and 121B in the motor driving circuits 120A and 120B, are inputted into the control calculating section 110. Also, a direct current is supplied to the motor driving circuits 120A and 120B through a noise filter 104 from the battery 103 as a direct-current power source.

The control calculating section 110 calculates the current command value I1* (or I2*) with reference to a map A in advance set based on the steering torque Ts and the vehicle speed Vs when the motor driving circuits 120A and 120B are normal, and calculates the current command values I1* (or I2*) with reference to a map B in advance set based on the steering torque Ts and the vehicle speed Vs when the motor driving circuits 120A and 120B are abnormal.

Further, the control calculating section 110 calculates a d-axis current command value Id* and a q-axis current command value Iq* of a d-q coordinate in a vector control based on the calculated current command value I1* (or I2*) and the rotor rotational angle θm, and calculates a U-phase current command value Iu*, a V-phase current command value Iv* and a W-phase current command value Iw* by performing a 2-phase/3-phase conversion with respect to the calculated d-axis current command value Id* and the q-axis current command value Iq* in accordance with the rotor rotational angle θm. Then, the control calculation section 110 calculates current deviations ΔIu, ΔIv and ΔIw between the calculated the U-phase current command value Iu*, the V-phase current command value Iv*, the W-phase current command value Iw* and additional values of each phase of current values detected by the current detecting circuits 121A and 121B. The control calculation section 110 performs a PI-control calculation and so on with respect to the current deviations ΔIu, ΔIv and ΔIw, calculates 3-phase voltage command values V1* and V2* for the motor driving circuits 120A and 120B, and respectively inputs the calculated 3-phase voltage command values V1* and V2* into the motor driving circuits 120A and 120B.

Also, the motor current detection values I1ud, I1vd, I1wd and I2ud, I2vd, I2wd that are detected in the abnormality detecting circuits 131A and 131B provided between the motor current cut-off circuits 130A, 130B and the first motor winding L1, the second motor winding L2 of the motor 200 are inputted into the control calculation section 110. Further, the control calculating section 110 comprises the abnormality detecting section 111 that compares the inputting motor current detection values I1ud, I1vd, I1wd and I2ud, I2vd, I2wd with the each phase current command values Iu*, Iv*, Iw* that are calculated by itself, and then detects an open failure (OFF-failure) and a short failure (ON-failure) of field effect transistors (FET) Q1-Q6 serving as switching elements that constitute inverters 122A and 122B. The abnormality detecting section 111 inputs an abnormality detection signal SAa or Sab into the gate driving circuit 123A or 123B of the motor driving circuit 120A or 120B that detects the abnormality when the open failure or the short failure of FETs comprising the inverters 122A and 122B is detected.

The motor driving circuits 120A or 120B respectively generate gate signals by inputting the 3-phase voltage command value V1* and V2* outputted from the control calculating section 110, and comprises the gate driving circuits 123A and 123B serving as the current control sections at the abnormality time and the inverters 122A and 122B to input the gate signals outputted from the gate driving circuits 123A and 123B.

Each of the motor driving circuits 123A and 123B generates 6 PWM-signals based on the voltage command values V1* and V2* and a carrier signal Sc of a triangular wave by inputting the voltage command values V1* and V2*, and inputs these PWM-signals into the inverters 122A and 122B.

Furthermore, in the case of normality that the abnormality detection signal SAa is not inputted from the control calculating section 110, the gate driving circuit 123A outputs 3 gate-signals of a high level into the motor current cut-off circuit 130A, and outputs 2 gate-signals of the high level into the power source cut-off circuit 124A. Further, in the case of abnormality that the abnormality detection signal SAa is inputted from the control calculating section 110, the gate driving circuit 123A simultaneously outputs 3 gate-signals of the low level into the motor current cut-off circuit 130A, cuts-off the motor currents, simultaneously outputs 2 gate-signals of the low level into the voltage supply cut-off circuit 124A, and then cuts-off the battery power.

Similarly, in the case of normality that the abnormality detection signal SAb is not inputted from the control calculating section 110, the gate driving circuit 123B outputs 3 gate-signals of a high level into the motor current cut-off circuit 130B, and outputs 2 gate-signals of the high level into the power source cut-off circuit 124B. Further, in the case of abnormality that the abnormality detection signal SAb is inputted from the control calculating section 110, the gate driving circuit 123B simultaneously outputs 3 gate-signals of the low level into the motor current cut-off circuit 130B, cuts-off the motor currents, simultaneously outputs 2 gate-signals of the low level into the voltage supply cut-off circuit 124B, and then cuts-off the battery power.

A battery current of the battery 103 is inputted into the respective inverters 122A and 122B through the noise filter 104 and the power source cut-off circuits 124A and 124b, and the electrolytic capacitors CA and CB for smoothing are respectively connected to theirs input sides.

The inverters 122A and 122B respectively have 6 FETs Q1-Q6 serving as switching elements, and have the constitutions being parallel-connected with 3 switching-arms Sau, SAv and Saw that 2 FETs are serially connected. Further, by inputting the gate signals outputted from the gate driving circuits 123A and 123B to the gates of the FET Q1-Q6, the U-phase current Iu, the V-phase current Iv and the W-phase current Iw from the respective intervals of the FETs of the switching arms Sau, SAv and SAw are inputted into the first winding L1 and the second winding L2 of the motor 200 through the motor current cut-off circuits 130A and 130B.

The motor current cut-off circuit 130A has 3 FETs QA1, QA2 and QA3 for current cut-off, and the motor current cut-off circuit 130B has 3 FETs QB1, QB2 and QB3 for current cut-off. Then, the FETs QA1-QA3 and the FETs QB1-QB3 of the motor current cut-off circuits 130A and 130B are respectively connected in the same direction as each cathode of the parasitic diodes D are on side of the inverters 122A and 122B.

Furthermore, each of the power source cut-off circuits 124A and 124B has a serial-circuit constitution whose the parasitic diodes are reversed by connecting with each drains of 2 FETs QC1, QC2 and 2 FETs QD1, QD2. Then, sources of the 2 FETs QC1 and QD1 are connected each other and are connected to an output side of the noise filter 104, and sources of the 2 FETs QC2 and QD2 are respectively connected to sources of the 3 FETs Q1-Q3 of the inverters 122A and 122B.

Figure 6:
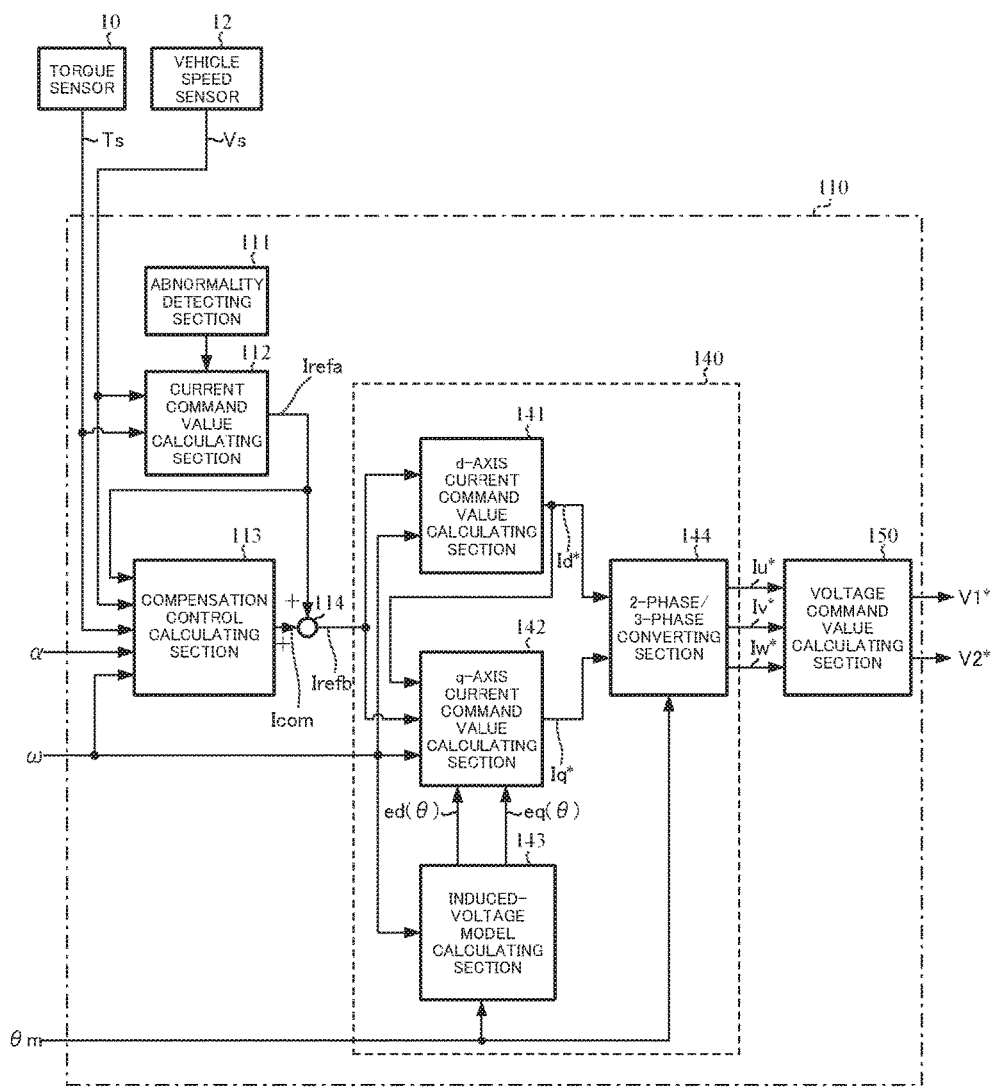
FIG. 6 is a block diagram showing a configuration example of a control calculating section.

The detail configuration example of the control calculating section 110 is shown in FIG. 6, the compensation control calculating section 113 calculates a convergence compensation value that compensates a convergence of a yaw rate based on, for example, the motor angular velocity ω, and calculates a torque compensation value that prevents a deterioration in an inertia sense or a control responsibility by compensating a torque corresponding part generated due to the inertia of the motor 200 based on the motor angular acceleration α. The compensation control calculating section 113 further calculates an SAT (Self-Aligning Torque)-compensation value that compensates an assist force of the motor 200 based on the estimated or detected SAT, and calculates a compensation signal Icom from the above compensation values. The compensation signal Icom is added to a current command value Irefa from the current command value calculating section 112 in the adding section 114, and the current command value Irefb after the compensation is calculated and then is inputted into the d-q axis current command calculating section 140.

The d-q axis current command value calculating section 140 comprises a d-axis current command value calculating section 141, a q-axis current command value calculating section 142, an induced-voltage model calculating section 143 and a 2-phase/3-phase converting section 144. The d-axis current command value calculating section 141 calculates the d-axis current command value Id* based on the current command value Irefa and the motor angular velocity ω. The induced-voltage model calculating section 143 calculates a d-axis EMF-component ed(θ) and a q-axis EMF-component eq(θ) of a d-q axis induced-voltage model EMF (Electro Magnetic Force) based on the motor rotational angle θm and the motor angular velocity ω. The q-axis current command value calculating section 142 calculates the q-axis current command value Iq* based on the d-axis EMF-component ed(θ) and the q-axis EMF-component eq(θ) outputted from the induced-voltage model calculating section 143, the d-axis current command value Id* calculated in the d-axis current command value calculating section 141, the current command value Irefb and the motor angular velocity ω.

The 2-phase/3-phase converting section 144 converts the d-axis current command value Id* and the q-axis current command value of 2-phases into the 3-phase current command values Ia*, Ib* and Ic*, and then inputs the current command values Ia*, Ib* and Ic* into the voltage command value calculating section 150.

The voltage command value calculating section 150 calculates the voltage command values V1* and V2* based on the U-phase current command value Iu*, the V-phase current command value Iv* and the W-phase current command value Iw* and the current detection values I1d and Id2 detected in the current detecting circuits 121A and 121B. Concretely, the voltage command value calculating section 150 calculates the each phase current detection values Iu, Iv and Iw from the current detection values I1d and Id2 detected in the current detecting circuits 121A and 121B, and calculates the current deviations ΔIu, ΔIv and ΔIw by respectively subtracting the each phase current detection values Iu, Iv and Iw from the U-phase current command value Iu*, the V-phase current command value Iv* and the W-phase current command value Iw*.

Then, the 3-phase voltage command values V1* and V2* for the motor driving circuits 120A and 120B are calculated by performing the PI-control calculation and so on with respect to the current deviations ΔIu, ΔIv and ΔIw. The 3-phase voltage command values V1* and V2* are outputted as the same values each other in the normal state that the abnormality detecting section 111 does not detect the abnormality, and the motor driving circuits 120A and 120B share the amount of the current needed for the steering assist by 50[%] each at the normal time.

In the motor control unit for such a 2-system winding motor, a motor coil characteristic and a control parameter will be described in the following case of the 1-system winding driving state.

The voltage equation that is considered the mutual inductance between phases is expressed as the following Equation 1.

$$V_{nu} = L_u \frac{dI_u}{dt} + M_{uv} \frac{dI_v}{dt} + M_{uw} \frac{dI_w}{dt} + R_u I_u + \omega_e \Phi_f \quad \text{[Equation 1]}$$

where, $V_{nu}$: the motor coil of the U-phase both-terminal voltage [V] (between the neutral point—the motor terminal), $I_u$, $I_v$, $I_w$: the motor coil current [A] of the U-phase, V-phase and W-phase, $L_u$: the self-inductance [H] of the U-phase, $M_{uv}$, $M_{uw}$: the mutual-inductance [H] between the U-phase and the V-phase and between the U-phase and the W-phase, $R_y$: the motor coil resistance [Ω] of the U-phase, $\omega_e$: the motor electric angular velocity [rad/s], and $\Phi_f$: the electric angular velocity induced-power coefficient (∝ torque constant) [V/(rad/s)]=[Wb]

The following Equation 2 is established by supposing that the clause of $\omega_e$ and $\Phi_f$ are perfectly canceled by means of a back-EMF compensation function and omitted.

$$V'_u = L_u \frac{dI_u}{dt} + M_{uv} \frac{dI_v}{dt} + M_{uw} \frac{dI_w}{dt} + R_u I_u \quad \text{[Equation 2]}$$

Here, supposing the mutual inductance $M_{uv}=M_{uw}$, this one is expressed as $M_p$ (an inter-system another phase mutual inductance [H]), $L_u$ as $L_p$ (an inter-system same phase mutual inductance [H]) in each, and the following Equation 3 is obtained by arranging the Equation 2.

$$V'_u = L_P \frac{dI_u}{dt} + M_P \left( \frac{dI_v}{dt} + \frac{dI_w}{dt} \right) + R_u I_u \quad \text{[Equation 3]}$$

$$= (L_P - M_P) \frac{dI_u}{dt} + M_P \left( \frac{dI_u}{dt} + \frac{dI_v}{dt} + \frac{dI_w}{dt} \right) R_u I_u$$

Here, according to the winding principle of the 3-phase motor, the following Equation 4 is established.

$$\frac{dI_u}{dt} + \frac{dI_v}{dt} + \frac{dI_w}{dt} = \frac{d}{dt}(I_u + I_v + I_w) = 0 \quad \text{[Equation 4]}$$

Consequently, the following Equations 5 and 6 are established by arranging the above Equation 3 with the Equation 4.

$$V'_u = (L_P - M_P) \frac{dI_u}{dt} + R_u I_u \quad \text{[Equation 5]}$$

$$I_u(s) = \frac{1}{(L_P - M_P)s + R_u} V'_u(s) \quad \text{[Equation 6]}$$

Therefore, the transfer function Pmu(s) of the motor 1-phase (U-phase) coil becomes the following Equation 7.

$$P_{mu}(s) = \frac{1}{(L_P - M_P)s + R_u} \quad \text{[Equation 7]}$$

Figure 7:
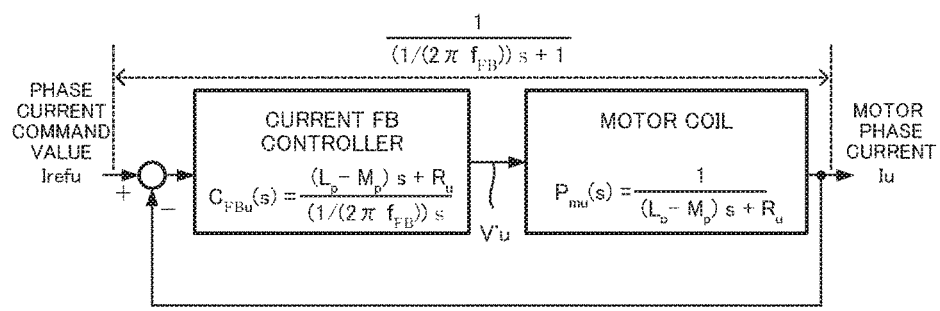
FIG. 7 is a block diagram explaining a motor coil characteristic and motor control parameters.

Accordingly, constituting the current feedback control system in series with the motor coil of the Equation 7 as shown in FIG. 7, the current feedback controller $C_{FB}(s)$ becomes the following Equation 8 so as to make the transfer function of "Irefu→Iu" correspond to the first-order lag model of the response frequency $f_{FB}$ [Hz].

$$C_{FBu}(s) = \frac{(L_P - M_P)s + R_u}{(1/(2\pi f_{FB}))s} \quad \text{[Equation 8]}$$

In the case of obtaining the motor phase current Iu supposing that the phase current command value Irefu of the U-phase is a feedback pathway comprising the current feedback controller due to the Equation 8 and the motor coil due to the Equation 7 as shown in FIG. 7, the transfer function of an input-output becomes the following Equation 9 since the item "$(L_P-M_P)s+R_u$" is canceled with a numerator and a denominator and forms a feedback loop. The currents of other phases are also the same.

$$\frac{1}{(1/(2\pi f_{FB}))s + 1} \quad \text{[Equation 9]}$$

Next, the motor coil characteristic and the motor parameters for control in a case of 2-system winding driving state will be described.

Supposing that the motor back-EMF is perfectly canceled by the back-EMF compensation similar to the case of 1-system, the voltage equation of the coils in the motor 1-system/1-phase (the first system/the U-phase) is expressed in the following Equation 10 considering the mutual inductances of the inter-system/the inter-phase.

$$V'_{1un} = L_{1u}\frac{dI_{1u}}{dt} + M_{1u1v}\frac{dI_{1v}}{dt} + \quad \text{[Equation 10]}$$
$$M_{1u2u}\frac{dI_{2u}}{dt} + M_{1u2v}\frac{dI_{2v}}{dt} + M_{1u2w}\frac{dI_{2w}}{dt} + R_{1u}I_{1u}$$

where, $V'_{1nu}$: the applying-current effective input voltage [V] of the first system and the U-phase, $I_{1u}$, $I_{1v}$, $I_{1w}$: the motor coil current [A] of the first system and the U-phase, the V-phase, W-phase, $I_{2u}$, $I_{2v}$, $I_{2w}$: the motor coil current [A] of the second system and the U-phase, the V-phase, W-phase, $L_{1u}$: the self-inductance [H] of the motor coil of the first system and the U-phase, $M_{1u1v}$: the mutual-inductance [H] between the first system, the U-phase and the first system, the V-phase,

:
:

$M_{1u2w}$: the mutual-inductance [H] between the first system, the U-phase and the second system, the W-phase, $R_{1u}$: the motor coil resistance [Ω] of the first system and the U-phase.

Here, supposing the mutual inductance $M_{1u1v}=M_{1u1w}$, and further supposing that this is $M_p$ (a system-in inter-phase [H]) and $M_{1u2v}=M_{1u2w}$, this is expressed as $M_S$ (an inter-system another phase mutual inductance [H]), $M_{1u2u}$ as $M_L$ (an inter-system same phase mutual inductance [H]) in each, and the following Equation 11 is obtained by arranging the Equation 10. As the premise, the following Equation 12 is established.

$$V'_{1un} = (L_P - M_P)\frac{dI_{1u}}{dt} + (M_L - M_S)\frac{dI_{2v}}{dt} + \quad \text{[Equation 11]}$$
$$M_S\left(\frac{dI_{2u}}{dt} + \frac{dI_{2v}}{dt} + \frac{dI_{2w}}{dt}\right) + R_{1u}I_{1u}$$
$$= (L_P - M_P)\frac{dI_{1u}}{dt} + (M_L - M_S)\frac{dI_{2u}}{dt} + R_{1u}I_{1u}$$

$$\frac{dI_{1u}}{dt} + \frac{dI_{1v}}{dt} + \frac{dI_{1w}}{dt} = 0 \quad \text{[Equation 12]}$$
$$\frac{dI_{2u}}{dt} + \frac{dI_{2v}}{dt} + \frac{dI_{2w}}{dt} = 0$$

Furthermore, supposing $I_{1u}=I_{2u}$ (the currents of inter-system same phase are synchronized), this is expressed as $I_{1u}$, the following Equations 13 and 14 are established.

$$V'_{1un} = (L_P - M_P + M_L - M_S)\frac{dI_u}{dt} + R_{1u}I_{1u} \quad \text{[Equation 13]}$$

$$I_u(s) = \frac{1}{(L_P - M_P + M_L - M_S)s + R_{1u}}V'_{1u}(s) \quad \text{[Equation 14]}$$

Accordingly, the transfer function $P_{m1u}(s)$ of the motor 1-system/1-phase (the first system/the U-phase) coil is expressed as the Equation 15.

$$P_{m1u}(s) = \frac{1}{(L_P - M_P + M_L - M_S)s + R_{1u}} \quad \text{[Equation 15]}$$

Figure 8:
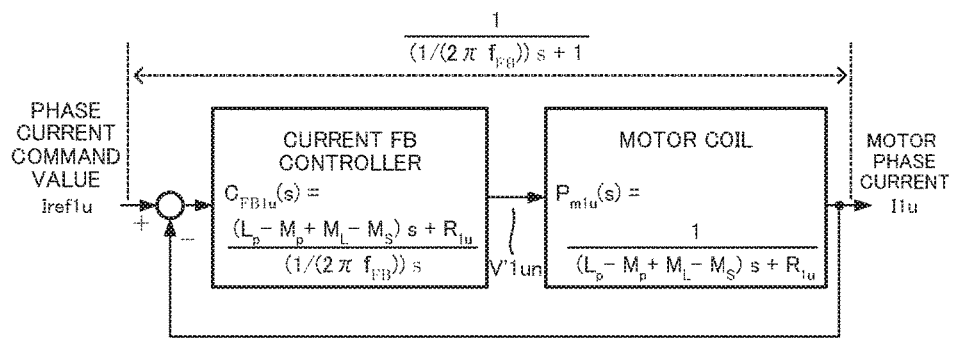
FIG. 8 is a block diagram explaining a motor coil characteristic and motor control parameters.

Accordingly, constituting the current feedback control system in series with the motor coil of the Equation 15 as shown in FIG. 8, the current feedback controller $C_{FB1u}(S)$ becomes the following Equation 16 so as to make the transfer function of "Iref1u→I1u" correspond to the first-order lag model of the response frequency $f_{FB}$ [Hz].

$$C_{FB1u}(s) = \frac{(L_P - M_P + M_L - M_S)s + R_{1u}}{(1/(2\pi f_{FB}))s} \quad \text{[Equation 16]}$$

In the case of obtaining the motor phase current Iu supposing that the phase current command value Iref1u of the U-phase is a feedback pathway comprising the current feedback controller due to the Equation 16 and the motor coil due to the Equation 15 as shown in FIG. 8, the transfer function of an input-output becomes the following Equation 9 since the item "$(L_p-M_{p+} M_L-M_S)$ s+$R_{1u}$" is canceled with a numerator and a denominator and forms a feedback loop. The currents of other phases are also the same.

Figure 9:
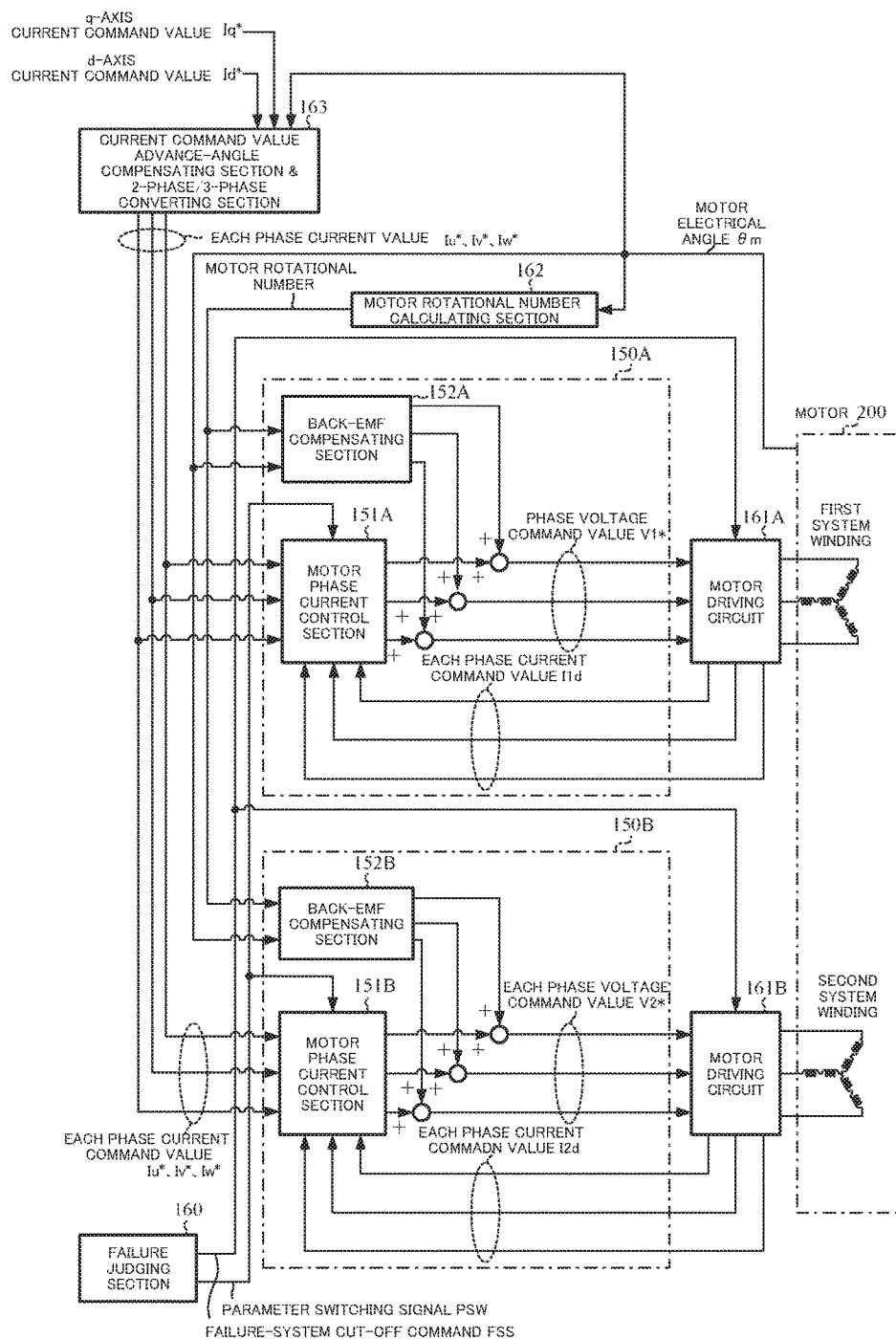
FIG. 9 is a block diagram showing a configuration example of the present invention.

As mentioned above, the transfer function is always able to keep the same by changing the parameters of the current feedback control section and the motor coil in the 1-system or the 2-system. Based on the above premise, the present invention comprises the voltage command value calculating sections 150A and 150B as shown in FIG. 9, and has the constitution so as to output a parameter switching signal PSW and a failure-system shut command FSS from the failure judging section 160 that judges to detect the failure or the abnormality.

That is, in the motor control unit of the present invention, the d-axis current command Id*, the q-axis current command Iq* and the motor electrical angle θm are inputted into the current command value advance-angle compensating section and 2-phase/3-phase converting section 163, and each of the U-phase current command value Iu*, the V-phase current command value Iv* and the W-phase current command value Iw* is inputted into the motor-phase current control sections 151A and 151B in the voltage command value calculating section 150A and 150B. Also, the motor electrical angle θm is inputted into the motor rotation number calculating section 162, and the calculated motor rotation number is inputted into the back-EMF compensating sections 152A and 152B in the voltage command value calculating sections 150A and 150B with the rotor electrical angle. The respective outputs of the motor-phase current control section 151A and the back-EMF compensating section 152A are added, the added result is inputted into the motor driving circuit 161A as the each phase voltage command value V1*, and the each phase current detection value I1d detected in the current detecting section within the motor driving circuit 161A is fed back to the motor-phase current control section 151A. Similarly, the respective outputs of the motor-phase current control section 151B and the back-EMF compensating section 152B are added, the added result is inputted into the motor driving circuit 161B as the each phase voltage command value V2*, and the each phase current detection value I2d detected in the current detecting section within the motor driving circuit 161B is fed back to the motor-phase current control section 151B.

As mentioned above, the failure judging section 160 judges a failure (including an abnormality), generates a failure-system cut-off command when a failure occurs, inputs it into the motor driving circuits 161A and 160B, and cuts-off the circuit of a failure system. The parameter switching signal PSW is inputted into the motor-phase current control sections 151A and 151B, and the parameters depending on the number of the driving winding system are changed. In other words, the parameter of the Equation 16 are determined as $(L_p-M_p+M_L-M_s)$ in the case of the normal 2-system driving, the parameters of the Equation 8 are determined as $(L_p-M_p)$ in the case of the other 1-system driving when 1-system is down by the failure.

In this way, in the motor control unit that controls the motor having multi-system motor winding through the motor driving circuit of each winding system, the motor control unit that can perform by switching the parameters of the current feedback control section, does not occur the noisy sound and the vibration without the physical discomfort feeling of the steering.

In the embodiment as mentioned above, the 3-phase motor of the 2-system winding is described, then a motor having the multi-system motor winding more than the 3-system can be applied similarly.

EXPLANATION OF REFERENCE NUMERALS 1 steering wheel
2 column shaft (steering shaft, handle shaft)
10 torque sensor
12 vehicle speed sensor
20 motor
30 control unit (ECU)
100 motor control unit
101 rotational position sensor
103 battery
110 control calculating section
111 abnormality detecting section
112 current command value calculating section
113 compensation control calculating section
120A, 120B motor driving circuit
121A, 121B current detecting circuit
122A, 122B inverter
123A, 123B gate driving circuit
124A, 124B power source cut-off circuit
130A, 130B motor current cut-off circuit
131A, 131B abnormality detecting circuit
140 d-q axis current command value calculating section
141 d-axis current command value calculating section
142 q-axis current command value calculating section
143 induced-voltage model calculating section
150, 150A, 150B voltage command value calculating section
160 failure judging section
200 2-system windings motor

The invention claimed is:

1. A motor control unit that controls a motor having a first system motor winding and a second system motor winding by means of a 3-phase current feedback system provided with a current control section through a motor driving circuit of each winding system, comprising:
  a failure judging section to detect a failure and make a judgement thereon, and to output a failure-system shut command and a parameter switching signal for each of a first system and a second system when said failure is judged; and
  a first system voltage command value calculating section and a second system voltage command value calculating section respectively having a first system motor phase current control section and a second system motor phase current control section including a motor inductance parameter as a parameter of a transfer function,
  wherein said motor inductance parameter is formed by assuming that "$M_p$" is a mutual inductance between phases of a same winding system of said motor, "$L_p$" is a self-inductance of said motor, "$M_S$" is a mutual inductance between one phase of said first system motor winding and another phase of said second system motor winding of said motor and "$M_L$" is a mutual inductance between one phase of said first system motor winding and a same phase of said second system motor winding of said motor,
  wherein, in a normal operating state when said failure is not judged by said failure judging section, 2-system current controls are performed and said parameter switching signal that is set to "OFF" is inputted into said first system motor phase current control section and a second system motor phase current control section, and said motor inductance parameters of said first system motor phase current control section and a second system motor phase current control section are set to "$L_P-M_P+M_L-M_S$" based on a value of said parameter switching signal so that a feed-back loop is formed by canceling "$L_P-M_P+M_L-M_S$" from a numerator and a denominator of said transfer function,
  wherein, in a failure occurring state when said failure is judged by said failure judging section, 1-system current control is performed by shutting said motor driving circuit of a failed system by means of said failure-system shut command, said parameter switching signal that is set to "ON" is inputted into said first system motor phase current control section and a second system motor phase current control section, and said motor inductance parameters of said first system motor phase current control section and a second system motor phase current control section are set to "$L_P-M_P$" based on a value of said parameter switching signal so that a feed-back loop is formed by canceling "$L_P-M_P$" from a numerator and a denominator of said transfer function, and
  wherein said transfer functions of said first system motor phase current control section and a second system motor phase current control section are same in said normal operating state and said failure occurring state.

2. The motor control unit according to claim 1, wherein a current feedback control is individually performed for 6-phases.

3. The motor control unit according to claim 1, wherein 3-phase current feedback controls are performed.

4. The motor control unit according to claim 1, wherein 4-phase current feedback controls are performed.

5. The motor control unit according to claim 1, wherein 2-phase current feedback controls are performed.

6. An electric power steering apparatus using the motor control unit according to claim 1, wherein an assist force is given to a steering system of a vehicle by a current command value calculated based on a steering torque at least.

7. A vehicle that is provided with the electric power steering apparatus according to claim 6.

* * * * *